United States Patent
van der Ham et al.

(10) Patent No.: US 8,658,744 B2
(45) Date of Patent: Feb. 25, 2014

(54) CONTROLLING $H_2$ DISTRIBUTION IN A HORIZONTAL STIRRED BED REACTOR

(75) Inventors: Mattijs van der Ham, Amsterdam (NL); Pierre Sere Peyrigain, Haguenau (FR); William D. Stephens, Batavia, IL (US)

(73) Assignee: Ineos USA LLC, Lisle, IL (US)

( * ) Notice: Subject to any disclaimer, the term of this patent is extended or adjusted under 35 U.S.C. 154(b) by 394 days.

(21) Appl. No.: 13/134,536

(22) Filed: Jun. 9, 2011

(65) Prior Publication Data

US 2012/0022222 A1    Jan. 26, 2012

Related U.S. Application Data

(60) Provisional application No. 61/397,332, filed on Jun. 10, 2010.

(51) Int. Cl.
- *C08F 2/34*    (2006.01)
- *C08F 2/38*    (2006.01)
- *C08J 3/20*    (2006.01)
- *C08F 210/06*  (2006.01)

(52) U.S. Cl.
USPC ............ 526/65; 526/68; 526/82; 526/905; 528/502 F

(58) Field of Classification Search
USPC .............. 526/65, 68, 905, 82; 528/502 F
See application file for complete search history.

(56) References Cited

U.S. PATENT DOCUMENTS

| | | | | |
|---|---|---|---|---|
| 3,965,083 | A * | 6/1976 | Jezl et al. | 526/65 |
| 6,900,281 | B2 * | 5/2005 | Streeky et al. | 526/348 |
| 2002/0010297 | A1 * | 1/2002 | Dolle et al. | 526/348 |

* cited by examiner

*Primary Examiner* — Fred M Teskin
(74) *Attorney, Agent, or Firm* — James J. Drake; Ineos USA LLC

(57) ABSTRACT

An olefin polymerization process comprises gas-phase polymerization of at least one olefin monomer in more than one polymerization zones in one or more polymerization reactors using a high activity catalyst injected in the front end of the reactor to give solid polymer particles. According to the process of the invention, different hydrogen to olefin ratios are controlled and applied to the reactor leading to the production of very different molecular weights and therefore broadening the molecular weight distribution of the polymer produced.

9 Claims, 1 Drawing Sheet

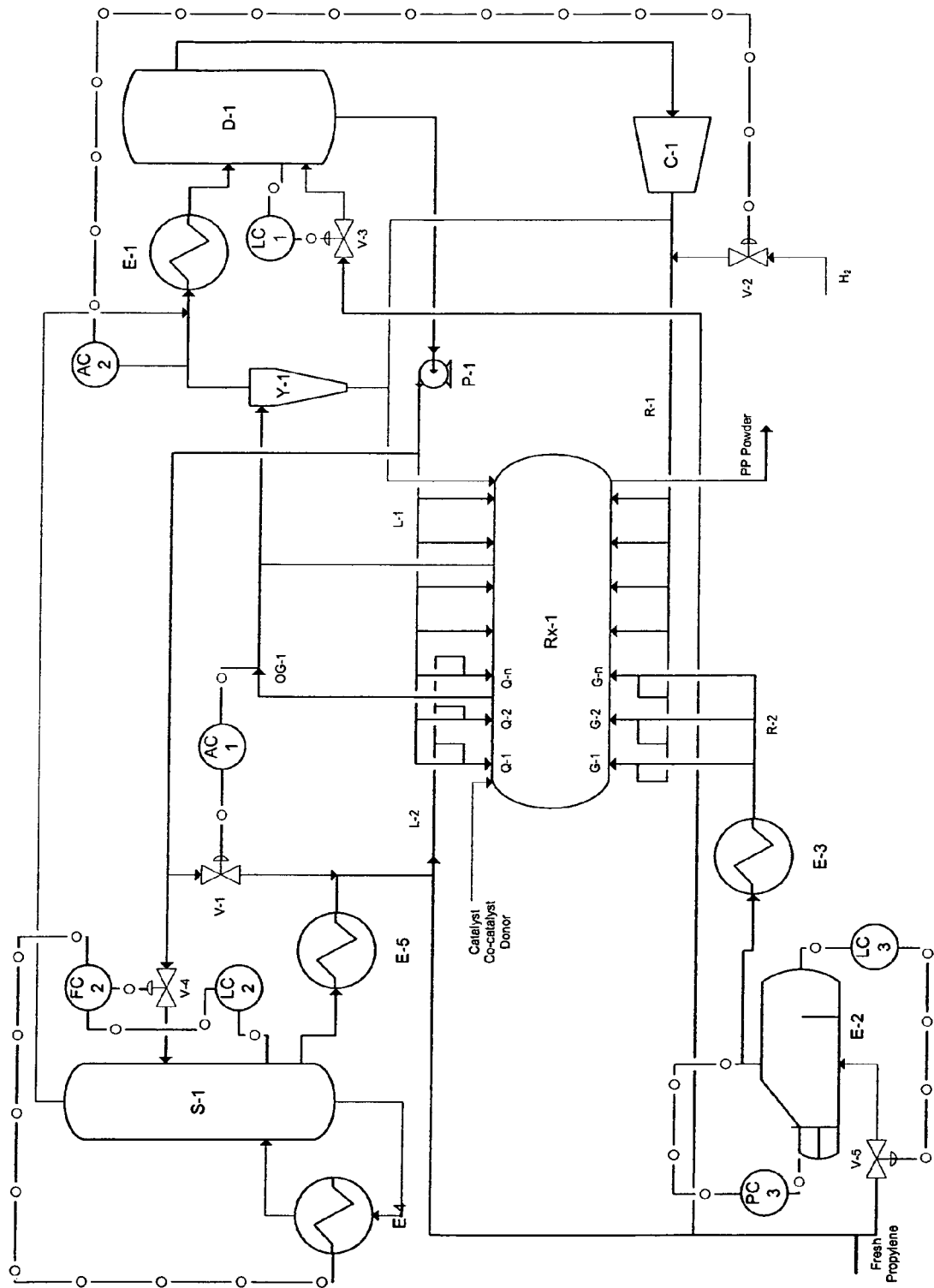

CONTROLLING H₂ DISTRIBUTION IN A HORIZONTAL STIRRED BED REACTOR

CROSS REFERENCE TO RELATED APPLICATIONS

This application claims the benefit of provisional patent application Ser. No. 61/397,332, filed Jun. 10, 2010, entitled "Controlling $H_2$ Distribution in a Horizontal Stirred Bed Reactor."

BACKGROUND OF THE INVENTION

1. Field of the Invention

The invention is in the field of chemical process control and, more specifically, in the field of polyolefin polymerization process control.

2. Description of the Prior Art

Manufacture of numerous types of thermoplastic olefin polymers now is well known and routinely commercially practiced based on Ziegler-Natta catalyst systems. Useful commercial manufacturing processes for olefin polymers using Ziegler-Natta catalysts have evolved from complex slurry processes using an inert hydrocarbon diluent, to efficient bulk processes using liquid propylene diluent, to even more efficient gas-phase processes in which solid polymer is formed directly from polymerizing gaseous olefin monomer.

Typically-used gas-phase processes include horizontally and vertically stirred sub-fluidized bed reactor systems, fluidized bed systems, as well as multi-zone circulating reactor systems. Thermoplastic olefin polymers made in these processes include polymers of ethylene and $C_3$-$C_{10}$+ alpha-olefin monomers and include copolymers of two or more of such monomers, such as statistical (random) copolymers or multiphasic (rubber-modified or impact) copolymers.

Polymers of propylene, which contain crystalline polypropylene segments, are advantageously produced in the gas phase. Such propylene polymers include polypropylene homopolymer in which essentially all of the monomer units are propylene and copolymers of propylene with up to fifty mole percent (50 mole %) of one or more of ethylene or $C_4$+ olefin monomer. Usually, propylene/ethylene copolymers contain up to about 30 wt. %, typically up to about 20 wt. %, of ethylene monomer units. Depending on the desired use, such copolymers may have a random or statistical distribution of ethylene monomer units or may be composed of an intimate mixture of homopolymer and random copolymer chains, typically referred to as rubber-modified or impact copolymers. In such rubber-modified or impact copolymers, typically a high ethylene content random copolymer functions as an elastomeric or rubber component to alter the impact properties of the combined polymer material.

The molecular weight of an olefin polymer, especially propylene polymers, typically is regulated by the use of hydrogen in the polymerization gas mixture. Generally speaking, a higher concentration of hydrogen will result in a lower molecular weight. The molecular weight distribution of the polymer composition, sometimes referred to as polydispersity, may affect polymer properties.

In horizontal stirred reactors, the average value of the distribution can be controlled by adjusting the inlet hydrogen flow rate to maintain a constant hydrogen to propylene ratio in the off-gas of the reactor. There is a direct link between the average chain length of the final polymer product and the gas phase hydrogen to propylene ratio. Known prior art processes cannot control molecular weight distribution broadness, but it is known that it varies slightly whatever the process conditions of operations.

The purpose of the instant invention is therefore to deal with the broadening of the molecular weight distribution of the polymer made in a horizontal stirred reactor. By applying a hydrogen gradient along the horizontal stirred reactor, the molecular weight distribution can be broadened and controlled in a large range of polydispersity indexes.

Polymer compositions containing polymer components with different physical properties have been found to have desirable properties. Thus, total polymer compositions containing different amounts of individual polymers in a multimodal distribution may result in a polymer with properties which are distinct from any of the polymer components. A conventional method of producing such multimodal polymers is to blend individual polymers by physical means, such as a blender or blending extruder. A more efficient method of obtaining a multimodal product composition is to produce the product directly in polymerization reactors. In such in situ production, a more intimate mixture may be produced, which results in more advantageous properties than are able to be produced by physical blending.

Producing a multimodal product typically requires a process in which polymerization occurs with different conditions at different times or places in the process. Although a single reactor may be used in a batch process to simulate a multi-reactor continuous process, typically batch processes are not practical commercially. A multi-reactor system may be used, which uses two or more reactor vessels.

Gas-phase or vapor-phase olefin polymerization processes are disclosed generally in "Polypropylene Handbook" pp. 293-298, Hamer Publications, NY (1996), and more fully described in "Simplified Gas-Phase Polypropylene Process Technology" presented in Petrochemical Review, March, 1993. The disclosures of these publications are hereby incorporated herein by reference.

As described in U.S. Patent Application No. 2012/00951712, the disclosure of which is hereby incorporated by reference, it is possible to use a hydrogen gradient in a horizontal stirred bed reactor to produce polyolefins having a broad molecular weight distribution.

There is a need for an olefin polymerization process in which product composition may be controlled, especially among different polymerization zones. Also, there is a need for a polymerization process which is able to broaden and control the molecular weight distribution of the polymer made in a stirred horizontal reactor.

The instant invention comprises a method of controlling a polymerization process that creates a hydrogen gradient within the reactor. Polymers of very different molecular weight are then produced leading to a broadened molecular weight distribution. The homopolymers made in a single reactor under these "hydrogen gradient" conditions have shown better processability and higher melt strength than previously known processes.

Thanks to the broadening of the molecular weight distribution, several final properties of the polymer are enhanced without any detrimental effects on other properties. In addition, the process of the invention makes it possible to make new products (or enhanced products) by operating the process under new conditions.

BRIEF DESCRIPTION OF THE DRAWINGS

FIG. 1 is a schematic diagram showing a horizontally agitated subfluidized bed reactor and associated equipment for the manufacture of polypropylene.

SUMMARY OF THE INVENTION

The process of the invention comprises a means of controlling a required hydrogen distribution by varying the number of hydrogen-lean and hydrogen-rich recycle liquid monomer injection points as well as the concentration of hydrogen in the hydrogen-lean streams.

Alternatively, and in addition to the foregoing, one or more fresh monomer and recycle gas injection points may be used in varied numbers. The number of injection points is varied manually to control the fraction of polymer made in the hydrogen rich and lean regions of the reactor. The concentration of hydrogen in the hydrogen-lean stream is varied to adjust the composition in the low hydrogen zone while the overall hydrogen to olefin ratio is adjusted to achieve the final polymer melt index.

The process of the invention allows a polyolefin polymerization plant to be configured to produce a range of polymer melt indexes more consistently and on target than prior art processes.

The process of the invention provides the ability to practice a staged $H_2$ reactor configuration with improved flexibility to control block copolymer ratios while optimizing reactor volume use through the ability to switch in and out required feed and vapor offtake nozzles along the reactor. The production split is controlled by controlling the volume of reactor in each $H_2$ concentration, as well as the concentration in each zone.

The number of $H_2$ lean gas and liquid inlets is varied according to the fraction of polymer to be produced in each polymer producing zone of the reactor system. Gas discharge valves can be opened or closed as needed to manage overall gas flow pattern in the reactor. The composition of the $H_2$ lean liquid feed is varied to adjust the melt flow index ("MFI") of the high molecular weight fraction while the overall off-gas $H_2$ composition is adjusted to achieve the desired final polymer MFI.

DETAILED DESCRIPTION OF THE INVENTION

According to the process of this invention, olefin monomers including propylene and mixtures of propylene with ethylene and other alpha-olefins are polymerized in a polymerization reactor using a monomer feed and an appropriate high activity polymerization catalyst. In a preferred embodiment, the process of the invention utilizes a high activity Ziegler-Natta catalyst system comprising a solid, titanium-containing component in combination with at least one aluminum alkyl cocatalyst in multiple polymerization zones.

The process of the invention comprises polymerization of at least one olefin monomer in more than one polymerization zone of one or more reactors. The process begins by introducing one or more streams of olefin monomer into a first polymerization zone. Each stream has hydrogen concentrations of 0 mole % to about 70 mole %, and preferably from about 0 mole % to about 30 mole %.

Following introduction of the one or more olefin streams into the first polymerization zone, a second step of introducing one or more streams of olefin monomer into a subsequent polymerization zone is carried out. As before, each stream has hydrogen concentrations of 0 mole % to about 70 mole %, and preferably from about 0 mole % to about 30 mole %. According to the process of the invention, there may be one or more additional polymerization zones depending on the type of olefin being manufactured and the degree of molecular weight distribution desired by the manufacturer.

Once the polymerization has been carried out, a polymer product having a polydispersity of from about 5 to about 20 is removed from the last polymerization zone.

In an alternative embodiment of the invention, propylene is polymerized in a first reaction zone and a mixture of propylene and ethylene are polymerized in a subsequent polymerization zone. Such polymerization may be carried out at the same temperature or at different temperatures, depending upon the type of olefin being polymerized. Further such polymerization may be carried out using a co-catalyst, such as silane. In such an embodiment, the propylene or a mixture of propylene and ethylene is polymerized in a first reaction zone with a first co-catalyst and propylene or mixtures of propylene and ethylene are polymerized in a subsequent polymerization zone in which a different (or combination of the first and a different) co-catalyst is introduced.

Preferably, the olefin polymerization process of the invention is carried out in an apparatus comprising one or more reactor vessels to which olefin monomer and catalyst components can be added and which contain an agitated bed of forming polymer particles. Each reactor may have multiple polymerization zones or each vessel may independently be a separate polymerization zone, according to the process of the invention.

The reactor vessels include one or more valve-controlled ports through which catalyst components and quench liquid are added, wherein the catalyst components and quench liquid are added directly into and onto the bed of forming polymer particles;

According to the preferred embodiment of the invention, a recycle gas feed system is connected to one or more of the valve-controlled ports in the reactor vessels through which olefin monomer and quench liquid are provided to the reactor vessels. A preferred recycle gas feed system includes 1) a means for removing reactor off-gases along the top of the reactor; 2) a first separator for separating the quench liquid, polymer fines and catalyst components from polymerization monomer and hydrogen; and 3) a second separator for separating the polymerization monomer and hydrogen into separate recycle streams.

The apparatus further comprises one or more valve-controlled ports located underneath the polymer bed through which the olefin monomer and hydrogen gas are introduced to the reactor vessels and a take-off barrier situated at the exit end of the reactor through which solid polymer product is removed. A device for removing solid polymer product from the take-off barrier and a finishing apparatus for adding suitable additives to the solid polymer product is connected to the take-off barrier. Finally, an extruder for incorporating the additives into the polymer by heating and mechanical shear and extruding the heated polymer through a die to form discrete pellets is used to complete production.

In a horizontal stirred reactor operated according to the process of the invention, a catalyst is injected in the front end of the reactor and polymerizes to give solid polymer particles. Polymerized particles, made of chains of different molecular weights, are withdrawn in the back end of the reactor. Control of the average chain lengths of the polymer products is achieved by the injection of hydrogen at various points into the reactor. A higher hydrogen to propylene ratio creates polymers having a shorter chain length.

According to prior art process designs, the gas phase hydrogen to propylene ratio along a horizontal reactor is nearly constant. In the process of the invention, different hydrogen to propylene ratios are applied to the reactor leading to the production of very different molecular weights and therefore broadening the molecular weight distribution of the final product.

According to one embodiment of the invention, nearly hydrogen free-streams (either gas or liquid) are fed into the front end of the reactor and streams (either gas or liquid) having higher hydrogen concentrations are fed into the back end of the reactor. Very high molecular weight polymers are then produced in the first part of the reactor and low molecular weight polymers are produced in the second part of the same reactor. This leads to the broadening of the molecular weight distribution of the final product. Fine control of this distribution can be achieved by modifying the hydrogen to $C_3$ ratios respectively in the front end and back end of the reactor.

The length and the concentration of a given chain produced according to the process of the invention can be measured through various devices (Gel Permeation Chromatography) and are often expressed in the form of molecular weight distribution (or chain length distribution). This type of distribution is characterized by an average value and broadness (also called polydispersity index) and both values are important for the final properties of the polymer. By applying a hydrogen gradient along the horizontal stirred reactor, the molecular weight distribution can be broadened and controlled in a large range of polydispersity index.

As used in this invention, a polymerization zone may be a separate polymerization reactor vessel or may represent different locations in a substantially plug flow reactor, in which there are differing polymerization conditions such as temperature and hydrogen, monomer, and catalyst modifier compositions. As an illustration, a substantially plug flow polymerization reactor as described in U.S. Pat. No. 6,900,281 does not require physically separated reaction zones, although polymerization conditions may be distinct between the front end and back end of the reactor described.

According to the process of the invention, in a single reactor or multiple reactor systems, hydrogen may be added at different locations or zones in the reactor(s). Typically, hydrogen-free propylene is added at the front (or initial polymerization zone) of a first polymerization reactor. Propylene streams containing progressively higher concentrations of hydrogen, may be added in a subsequent polymerization zone in the same reactor, i.e., further down the polymerization reactor. If there is more than one reactor, propylene streams containing progressively higher concentrations of hydrogen also may be added to a subsequent reactor. Such propylene streams containing progressively higher concentrations of hydrogen need not be added at the front of a second reactor, but may be added along such reactor.

For polymerization of olefins, high activity supported (HAC) titanium-containing components useful in this invention typically are supported on hydrocarbon-insoluble, magnesium-containing compounds. For polymerization of alpha-olefins such as propylene a solid transition metal component typically also contains an electron donor compound to promote stereospecificity. Such supported titanium-containing olefin polymerization catalyst component typically is formed by reacting a titanium (IV) halide, an organic electron donor compound and a magnesium-containing compound. Optionally, such supported titanium-containing reaction product may be further treated or modified by further chemical treatment with additional electron donor or Lewis acid species.

Suitable magnesium-containing compounds include magnesium halides; a reaction product of a magnesium halide such as magnesium chloride or magnesium bromide with an organic compound, such as an alcohol or an organic acid ester, or with an organometallic compound of metals of Groups 1, 2, or 13; magnesium alcoholates; or magnesium alkyls.

Examples of supported solid, titanium-containing catalysts are prepared by reacting a magnesium chloride, alkoxy magnesium chloride or aryloxy magnesium chloride with a titanium halide, such as titanium tetrachloride, and further incorporation of an electron donor compound. In a preferable preparation, the magnesium-containing compound is dissolved, or is in a slurry, in a compatible liquid medium, such as a hydrocarbon to produce suitable catalyst component particles. Ethylene polymerization catalysts also may be supported on oxides such as silica, alumina, or silica alumina.

Polymerization catalyst systems typically employed in gas-phase processes) include a high activity supported solid titanium-based catalyst component, a trialkylaluminum activator or cocatalyst component and an external modifier or donor component. Separately, the catalyst components are inactive; thus, the catalyst and activator components may be suspended in propylene and fed to the reactor as separate streams without initiating polymer formation in the feed lines. Suitable solid supported titanium catalyst systems are described in U.S. Pat. Nos. 4,866,022, 4,988,656, 5,013,702, 4,990,479 and 5,159,021, incorporated herein by reference. These possible solid catalyst components only are illustrative of many possible solid, magnesium-containing, titanium halide-based, hydrocarbon-insoluble catalyst components useful in this invention and known to the art. This invention is not limited to a specific catalyst component.

In a typical supported catalyst of this invention, the magnesium to titanium atom ratio is above about 1 to 1 and may range to about 30 to 1. More preferably, the magnesium to titanium ratio ranges from about 10:1 to about 20:1. The internal electron donor components typically are incorporated into the solid, supported catalyst component in a total amount ranging up to about 1 mole per gram atom of titanium in the titanium compound, and preferably from about 0.5 to about 2.0 mole per gram atom of titanium in the titanium compound. Typical amounts of internal donor are at least 0.01 mole per gram atom of titanium, preferably above about 0.05 and typically above about 0.1 mole per gram atom of titanium. Also, typically, the amount of internal donor is less than 1 mole per gram atom of titanium, and typically below about 0.5 mole per gram atom of titanium.

The solid, titanium-containing component preferably contains from about 1 to about 6 wt. % titanium, from about 10 to about 25 wt. % magnesium, and from about 45 to about 65 wt. % halogen. Typical solid catalyst components contain from about 1.0 to about 3.5 wt. % titanium, from about 15 to about 21 wt. % magnesium and from about 55 to about 65 wt. % chlorine.

The amount of solid catalyst component to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from about 0.2 to 0.01 milligrams of catalyst to gram of polymer produced.

Internal electron donor materials which may be useful in this invention are incorporated into a solid, supported catalyst component during formation of such component. Typically, such electron donor material is added with, or in a separate step, during treatment of a solid magnesium-containing material with a titanium (IV) compound.

Most typically, a solution of titanium tetrachloride and the internal electron donor modifier material is contacted with a magnesium-containing material. Such magnesium-containing material typically is in the form of discrete particles and may contain other materials such as transition metals and organic compounds.

Preferred electron donor compounds include esters of aromatic acids. Electron donors of mono- and dicarboxylic acids and halogen, hydroxyl, oxo-, alkyl-, alkoxy-, aryl-, and aryloxy-substituted aromatic mono- and dicarboxylic acids are preferred. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl p-toluate. An especially preferred aromatic ester is a dialkylphthalate ester in which the alkyl group contains from about two to about ten carbon atoms. Examples of preferred phthalate ester are diisobutylphthalate, diethylphthalate, ethylbutylphthalate and d-n-butylphthalate. Other useful internal donors are substituted diether compounds, esters of substituted succinic acid, substituted glutaric acid, substituted malonic acid, and substituted fumaric or maleic acids.

The co-catalyst component preferably is an organoaluminum compound that is halogen free. Suitable halogen-free organoaluminum compounds include, for example, alkylaluminum compounds of the formula AlR3, where R denotes an alkyl radical having 1 to 10 carbon atoms, such as, for example, trimethylaluminum (TMA), triethylaluminum (TEA) and triisobutylaluminum (TIBA).

Examples of suitable alkyl radicals, R, include methyl, ethyl, butyl, hexyl, decyl, tetradecyl, and eicosyl. Aluminum alkyls are preferred and most preferably trialkylaluminums containing 1 to about 6 carbon atoms per alkyl radical, and particularly triethylaluminum and triisobutylaluminum or a combination thereof are used. In aspects of this invention which require a combination of less active with more active aluminum alkyl components, triethylaluminum is a preferable active component and less active components including tri-n-butyl-aluminum (TNBA), tri-n-hexyl aluminum (TNHA), tri-n-octyl aluminum (TNOA), and the like.

In the process of this invention, a mixture of alkyl aluminum compounds may be used as a co-catalyst component in one or more polymerization zones. Such a mixture of alkyls can be used to control the properties of the products made in those polymerization zones. Although not preferred, but if desired, aluminum alkyls having one or more halogen or hydride groups can be employed, such as ethylaluminum dichloride, diethylaluminum chloride may be used in a co-catalyst component.

Olefin monomer may be provided to the reactor through a recycled gas and quench liquid system in which unreacted monomer is removed as off-gas, partially condensed and mixed with fresh feed monomer, and injected into the reactor vessel. A quench liquid is injected into the process stream in order to control temperature. In propylene polymerization, the quench liquid can be liquid propylene. In other olefin polymerization reactions, quench liquid can be a liquid hydrocarbon such as propane, butane, pentane or hexane, preferably isobutane or isopentane. Depending on the specific reactor system used, quench liquid can be injected into the reactor vessel above or within the bed of polymer particles. Following injection into the reactor vessel, excess quench liquid is removed from the reactor by way of a separator. The quench liquid is then re-introduced to the reactor via a recycle line.

In one configuration of the process of the invention, a second separator is added after the first separator in order to remove hydrogen from the quench liquid coming from the separator. A preferred second separator would be a stripper apparatus. The recycled quench liquid is separated by the stripper into hydrogen-free streams of monomer and substantially monomer-free streams of hydrogen. The hydrogen-free streams of monomer can then be re-introduced to the reactor vessel at the front of the reaction process while the hydrogen is sent to the back of the process to maintain the hydrogen gradient within the process.

Control of the hydrogen gradient is done by playing on the number of nozzles that are fed with hydrogen-free streams. Accordingly, the amount of liquid "treated" in the stripper varies with the number of nozzles that are fed with hydrogen-free streams. The stripper can also be used to control the amount of hydrogen in the hydrogen-free streams and therefore the gradient within the reactor.

In some applications, alkyl zinc compounds such as diethyl zinc (DEZ) may be added as an additional external modifier to produce high MFR polymer as described in U.S. Pat. No. 6,057,407, incorporated by reference herein. Use of small amounts of DEZ in combination with tetraethylorthosilicate (also known as tetraethoxysilane) (TEOS) may be beneficial because lesser amounts of hydrogen are needed to produce high MFR polymers. Small amounts of DEZ allow high MFR polymers to be produced at lower hydrogen concentrations and higher yield. To optimize the activity and stereospecificity of this cocatalyst system in alpha-olefin polymerization, it is preferred to employ one or more external modifiers, typically electron donors, such as silanes, mineral acids, organometallic chalcogenide derivatives of hydrogen sulfide, organic acids, organic acid esters and mixtures thereof.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

The aforesaid cocatalyst system advantageously and preferably contains an aliphatic or aromatic silane external modifier. Preferable silanes useful in the aforesaid cocatalyst system include alkyl-, aryl-, and/or alkoxy-substituted silanes containing hydrocarbon moieties with 1 to about 20 carbon atoms. Especially preferred are silanes having a formula: SiY4, wherein each Y group is the same or different and is an alkyl or alkoxy group containing 1 to about 20 carbon atoms. Preferred silanes include isobutyltrimethoxysilane, diisobutyldimethoxysilane, diisopropyldimethoxysilane, n-propyltriethoxysilane, isobutylmethyldimethoxysilane, isobutylisopropyldimethoxysilane, dicyclopentyldimethoxysilane, tetraethylorthosilicate, dicyclohexyldimethoxysilane, diphenyldimethoxysilane, di-t-butyldimethoxysilane, t-butyltrimethoxysilane, and cyclohexylmethyldimethoxysilane. Mixtures of silanes may be used.

Electron donors are employed with Ziegler-Natta catalyst systems to control stereoregularity by controlling the relative amounts of isotactic and atactic polymers (which may be measured by boiling heptane extraction or nuclear magnetic resonance (nmr) pentad analysis) in the product. The more stereoregular isotactic polymer typically is more crystalline, which leads to a material with a higher flexural modulus.

Such highly crystalline, isotactic polymers also display lower melt flow rates, as a consequence of a reduced hydrogen response of the electron donor in combination with the catalyst during polymerization. The preferred electron donors of the present invention are external electron donors used as stereoregulators in combination with Ziegler-Natta catalysts. Therefore, the term "electron donor", as used herein, refers specifically to external electron donor materials, also referred to as external donors.

Preferably, suitable external electron donor materials include organic silicon compounds, typically are silanes having a formula, Si(OR)n R'4-n, where R and R' are selected independently from C1-C10 alkyl and cycloalkyl groups and n=1-4. Preferably, the R and R' groups are selected independently from C2 to C6 alkyl and cycloalkyl groups such as ethyl, isobutyl, isopropyl, cyclopentyl, cyclohexyl, and the like. Examples of suitable silanes include tetraethoxysilane (TEOS), dicyclopentyldimethoxysilane (DCPDMS), diisopropyldimethoxysilane (DIPDMS), diisobutyldimethoxysilane (DIBDMS), isobutylisopropyldimethoxysilane (IBIPDMS), isobutylmethyldimethoxysilane (IBMDMS), cyclohexylmethyldimethoxysilane (CHMDMS), di-tert-butyldimethoxysilane (DTBDMS), n-propyltriethoxysilane (NPTEOS), isopropyltriethoxysilane (IPTEOS), octyltriethoxysilane (OTEOS), and the like. The use of organic silicon compounds as external electron donors is described, for example, in U.S. Pat. Nos. 4,218,339; 4,395,360; 4,328,122; and 4,473,660, all of which are incorporated herein by reference. Although a broad range of compounds are known generally as electron donors, a particular catalyst may have a specific compound or groups of compounds with which it is especially compatible and which may be determined by routine experimentation.

A typical catalyst system for the polymerization or copolymerization of alpha olefins is formed by combining the supported titanium-containing catalyst or catalyst component of this invention and an alkyl aluminum compound as a cocatalyst, together with at least one external modifier which typically is an electron donor and, preferably, is a silane. Typically, useful aluminum-to-titanium atomic ratios in such catalyst systems are about 10 to about 500 and preferably about 30 to about 300. Typically, sufficient alkyl aluminum is added to the polymerization system to activate the titanium-containing component completely.

In the process of this invention, aluminum to titanium ratios in the first polymerization zone typically are at least 10, typically at least 20 and may range up to about 300, as required for the process conditions chosen. The Al/Ti ratio for added co-catalyst may be less or more than added in the first polymerization zone. This ratio is calculated based on the amount of alkyl aluminum added in proportion to the amount of titanium-containing component added initially. Typical Alai ratios for co-catalyst added in subsequent polymerization zones are at least 10, preferably at least 15, and typically at least 30.

Typical aluminum-to-electron donor molar ratios (e.g., Al/Si) in such catalyst systems are about 1 to about 60. Typical aluminum-to-silane compound molar ratios in such catalyst systems are above about 1.5, preferably above 2.5 and more preferably about 3. This ratio may range up to 200 or higher and typically ranges to about 150 and preferably does not exceed 120. A typical range is about 1.5 to about 20. An excessively high Al/Si or low silane quantity will cause operability problems such as low isotactic sticky powder.

The amount of the Ziegler-Natta catalyst or catalyst component of this invention to be used varies depending on choice of polymerization or copolymerization technique, reactor size, monomer to be polymerized or copolymerized, and other factors known to persons of skill in the art, and can be determined on the basis of the examples appearing hereinafter. Typically, a catalyst or catalyst component of this invention is used in amounts ranging from about 0.2 to 0.02 milligrams of catalyst to gram of polymer or copolymer produced.

The process of this invention is useful in polymerization or copolymerization of ethylene and alpha-olefins containing 3 or more carbon atoms such as propylene, butene-1, pentene-1,4-methylpentene-1, and hexene-1, as well as mixtures thereof and mixtures thereof with ethylene. Typical olefin monomers include up to C14 alpha-olefins, preferably up to C8 alpha-olefins, and more preferably up to C6 alpha-olefins. The process of this invention is particularly effective in the stereospecific polymerization or copolymerization of propylene or mixtures thereof with up to about 50 mol percent (preferably up to about 30 mol percent) ethylene or a higher alpha-olefin. According to the invention, branched crystalline polyolefin homopolymers or copolymers are prepared by contacting at least one alpha-olefin with an above-described catalyst or catalyst component with a radical generating compound under suitable polymerization or copolymerization conditions. Such conditions include polymerization or copolymerization temperature and time, pressure(s) of the monomer(s), avoidance of contamination of catalyst, the use of additives to control homopolymer or copolymer molecular weights, and other conditions well known to persons skilled in the art.

Irrespective of the polymerization or copolymerization process employed, polymerization or copolymerization should be carried out at temperatures sufficiently high to ensure reasonable polymerization or copolymerization rates and avoid unduly long reactor residence times, but not so high as to result in the production of unreasonably high levels of stereorandom products due to excessively rapid polymerization or copolymerization rates. Generally, temperatures range from about 0° to about 120° C. with a range of from about 20° C. to about 95° C. being preferred from the standpoint of attaining good catalyst performance and high production rates. More preferably, polymerization according to this invention is carried out at temperatures ranging from about 50° C. to about 80° C.

Olefin polymerization or copolymerization according to this invention is carried out at monomer pressures of about atmospheric or above. Generally, monomer pressures range from about 1.2 to about 40 bar (120 to 4000 kPa), although in vapor phase polymerizations or copolymerizations, monomer pressures should not be below the vapor pressure at the polymerization or copolymerization temperature of the alpha-olefin to be polymerized or copolymerized.

The polymerization or copolymerization time will generally range from about ½ to several hours in batch processes with corresponding average residence times in continuous processes. Polymerization or copolymerization times ranging from about 1 to about 4 hours are typical in autoclave-type reactions.

Prepolymerization or encapsulation of the catalyst or catalyst component of this invention also may be carried out prior to being used in the polymerization or copolymerization of alpha olefins. A particularly useful prepolymerization procedure is described in U.S. Pat. No. 4,579,836, which is incorporated herein by reference.

Examples of gas-phase polymerization or copolymerization processes in which the catalyst or catalyst component of this invention is useful include both stirred bed reactors and fluidized bed reactor systems and are described in U.S. Pat. Nos. 3,957,448; 3,965,083; 3,971,768; 3,970,611; 4,129,701;

4,101,289; 4,535,134; 4,640,963; 6,069,212, 6,284,848, 6,350,054; and 6,590,131, all incorporated by reference herein. Typical gas phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. For production of impact copolymers, homopolymer formed from the first monomer in the first reactor is reacted with the second monomer in the second reactor. A quench liquid, which can be liquid monomer, can be added to polymerizing or copolymerizing olefin through the recycle gas system in order to control temperature.

The reactor includes means for introducing catalyst or a catalyst component into a plurality of sections contained therein, thereby allowing a controlled introduction of catalysts and quench liquid directly into and onto the stirred, subfluidized bed of forming polymer solid and polymerizing monomer from the vapor phase in and over such bed. As the solid polymer produced in the process builds up, it traverses the reactor length and is continuously removed by passing through a take-off barrier situated at the exit end of the reactor.

The reactor may optionally be compartmented, each compartment of the reactor being physically separated by a dividing structure so constructed that it serves to control vapor intermixing between compartments but allows free polymer particle movement from one compartment to the other in the direction of the take-off. Each compartment may include one or more polymerization sections, optionally separated by weirs or other suitably shaped baffles to prevent or inhibit gross backmixing between sections.

Monomer or monomer mixture and hydrogen are introduced largely or wholly underneath the polymer bed, and quench liquid is introduced onto the surface of the bed. Reactor off-gases are removed along the top of the reactor after removing polymer fines as completely as possible from the off-gas stream. Such reactor off-gases are led to a separation zone whereby the quench liquid is at least, in part, separated, along with any further polymer fines and some of the catalyst components, from polymerization monomer and hydrogen. Monomer and hydrogen are then recycled to inlets spaced along the various polymerization sections of the reactor located generally underneath the surface of the polymer bed. A portion of the quench liquid, including the further polymer fines, is taken off the separation zone and, in major part, returned to inlets spaced along the top of the reactor compartment. A second small portion of separated quench liquid, free of polymer fines and catalyst components, may be fed into a catalyst make-up zone for catalyst diluent so that fresh quench liquid need not be introduced for that purpose. Provision may be made in the reactor to introduce the catalyst components and quench liquid at different rates into one or more of the polymerization sections to aid in the control of the polymerization temperatures and polymer production rates. Catalyst components may be added on the surface or below the surface of the bed.

The overall reactor temperature range for polymerization depends upon the particular monomer which is being polymerized and the commercial product desired therefrom and, as such, is well-known to those skilled in the art. In general, the temperature range used varies between about 40° C. up to about the softening temperature of the bed. In a multi-reactor system, different polymerization temperatures may be used in each reactor to control polymer properties in those zones.

The recycle system of the process is designed so it, together with the reactor, operates essentially isobaric. That is, preferably, there is no more than a ±70 kPa pressure change in the recycle system and reactor, more preferably ±35 kPa, which is the normal pressure variation expected from operations.

The total polymerization pressure is composed of the monomer pressure, vaporized quench liquid pressure, and hydrogen pressure together with any inert gas pressure present and such total pressure typically may vary from above about atmospheric to about 600 psig (4200 kPa). The individual partial pressures of the components making up the total pressure determine the rate at which polymerization occurs, the molecular weight, and the molecular weight distribution of the polymer to be produced.

Irrespective of polymerization or copolymerization technique, polymerization or copolymerization advantageously is carried out under conditions that exclude oxygen, water, and other materials that act as catalyst poisons. Also, according to this invention, polymerization or copolymerization can be carried out in the presence of additives to control polymer or copolymer molecular weights. Hydrogen is typically employed for this purpose in a manner well known to persons of skill in the art. Although not usually required, upon completion of polymerization or copolymerization, or when it is desired to terminate polymerization or copolymerization or at least temporarily deactivate the catalyst or catalyst component of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Homopolymer or copolymer yields are sufficiently high relative to the amount of catalyst employed so that useful products can be obtained without separation of catalyst residues. Further, levels of stereorandom by-products are sufficiently low so that useful products can be obtained without separation thereof. The polymeric or copolymeric products produced in the presence of the catalyst can be fabricated into useful articles by extrusion, injection molding, thermoforming, and other common techniques.

A propylene polymer made according to this invention primarily contains a high crystalline polymer of propylene. Polymers of propylene having substantial polypropylene crystallinity content now are well-known in the art. It has long been recognized that crystalline propylene polymers, described as "isotactic" polypropylene, contain crystalline domains interspersed with some non-crystalline domains. Noncrystallinity can be due to defects in the regular isotactic polymer chain which prevent perfect polymer crystal formation.

After polymerization, polymer powder is removed from the polymerization reactor by methods known to the art, typically through a separate chamber or blowbox, and preferably transferred to a polymer finishing apparatus in which suitable additives are incorporated into the polymer, which is heated, typically by mechanical shear and added heat, in an extruder to above melt temperature, extruded through a die, and formed into discrete pellets. Before processed by the extruder, polymer powder may be contacted with air and water vapor to deactivate any remaining catalytic species.

Referring now to FIG. 1, in order to provide good control of the attributes of polymer products produced using the process of the invention, it is found to be beneficial to employ a novel approach when instrumenting and controlling said process. It has been found to be advantageous to include a second liquid recycle header L-2, in parallel with L-1, including flow indicators and control valves for all liquid feed ports, or more preferably ports one to n where n is three quarters of the total number of liquid feed ports.

According to a further embodiment of the invention, a duplicate recycle gas feed header R-2 in addition to R-1 is provided for all recycle gas ports, or more preferably ports one to n where n is three quarters of the total number of recycle gas ports. This arrangement provides a simple and easy way to switch between normal and staged-$H_2$ modes of operation within a given reactor with minimal risk of disruption.

The number of ports in service for $H_2$ lean liquid (L-2) and $H_2$-free recycle gas feeds (R-2) is a function of the catalyst performance and the desired quantity of material produced, respectively, in the established high and low $H_2$ concentration environments in reactor Rx-1 and may change for each type of product produced.

To produce the H2 lean liquid stream L-2, H2 is substantially removed from a portion of the liquid recycle stream L-1 in an H2-removing device S-1. The H2 lean liquid stream L-2 is preferably from about 10-300 ppmv (parts per million by volume). The H2-removing device S-1 is commonly referred to as a stripper. It is found to be advantageous to remove as much $H_2$ as possible from the stream entering the H2-removing device S-1 through valve V-4, without allowing the liquid inventory in the device to become too low. The inventory is measured using a level indicating instrument and level controller LC-2 is used to adjust the feed to S-1 through valve V-4 directly or more preferably using flow control device FC-2. Steam to E-4 is maintained in a desired ratio to the feed rate measured in FC-2. The H2-lean stream from S-1 is used as liquid recycle to reactor Rx-1 through ports Q-1 to Q-n. The H2-rich effluent from S-1 is recycled through exchanger E-5.

To produce H2-free gas stream R-2, fresh H2-free olefin feed (fresh propylene) is introduced through valve V-5 vaporized in vaporizer E-2 and superheated in E-3. It is advantageous to control the vaporizer level using LC-3 to adjust liquid feed to maintain a liquid inventory in E-2. Vaporizer heat input is manipulated using pressure controller PC-3 to maintain vaporizer pressure in E-2. H2-free olefin is fed to reactor Rx-1 via ports G-1 to G-n.

The $H_2$-free recycle gas stream and $H_2$-lean recycle liquid streams produce the desirable $H_2$ gradient described in the process of the invention. In order to maintain the desired gradient it is advantageous to measure $H_2$ in the first gas removing stream OG-1 or more preferably from a gas sample stream located near the front of reactor Rx-1 in order to maintain the correct $H_2$ to olefins ratio to obtain the desired molecular weight distribution of powder leaving reactor Rx-1 as PP Powder. Adjustments to the measured $H_2$ lean composition are made using valve V-1 to bypass $H_2$-rich liquid feed from $H_2$-removing device S-1 to $H_2$-lean liquid recycle streams Q-1 to Q-n.

The $H_2$ composition of reactor gas leaving cyclone Y-1 is measured and controlled by AC-2 adjusting fresh $H_2$ feed to the reactor through valve V-2. This gas is partially condensed in exchanger E-1 and accumulated in separator drum D-1 as liquid and gas recycle to reactor Rx-1 by way of a quench pump P-1. The liquid inventory of D-1 is maintained by controller LC-1 adjusting fresh, $H_2$-free olefin makeup.

As noted above, the melt index and molecular weight distribution of a polyolefin product are controlled by adjusting the number of $H_2$ lean liquid recycle ports in service and the number of $H_2$-free gas feed ports in service, according to the compositions of the two measured reactor gas samples of controllers AC-1 and AC-2.

Polymer mechanical and rheological properties are a function of the molecular weight distribution (MWD). Polymer melt flow rate, MFR, (or melt index) is a function of the number average (Mn) and weight average (Mw) molecular weight following the general form Mw or Mn=a(MFR)^b where a and b are unique to the catalyst system, as can be found in the literature. The polymer MWD is a function of reaction conditions such as temperature, $H_2$ concentration, monomer concentration, catalyst system and etc. and is frequently characterized by the Mw/Mn ratio.

Melt flow rate is often used as a proxy for the MWD since the molecular weight distribution cannot be readily measured with an on-line instrument. MFR can be readily measured at-line or even on-line with technologies known to those familiar with the art. Polypropylene MFR is related to both the Mw and Mn by relations known to those in the art. Broad molecular weight polyolefins can be constructed in different ways by combining two or more fractions of differing MWD to meet a target MFR. These different combinations will have different physical properties. Thus the amount of each fraction must be controlled to achieve the best result.

Generally polymer products will vary across a wide range of factors, including flex modulus, tensile strength, melt strength and melt viscosity. While modifying MFR most directly affects melt viscosity, changes to the MWD (reflected indirectly by the measured MFR) can affect any of the properties and will determine the final product recipe to be used.

In the present invention these fractions are controlled in a single reactor by varying the number of Q and G ports in $H_2$-lean service based on calculated polymerization rates for each reaction zone. An example polymerization rate calculation can be found in U.S. Pat. No. 5,504,166 the disclosure of which is incorporated herein by reference.

The molecular weight of the high molecular weight polymer is controlled by the $H_2$ concentration in the $H_2$-lean section of the reactor by adjusting the efficiency of S-1, steam to a reboiler for example, and/or the bypass of $H_2$-rich feed around S-1. The molecular weight of the low molecular weight fraction is controlled by adjusting the fresh $H_2$ feed to the low molecular weight section of the reactor to achieve the target polymer MFR. Thus the ratio of the gas compositions can become a proxy for polymer MWD at a given target MFR.

The MWD will depend on the amount of each fraction (e.g. 50/50) and on the MFI of each fraction. As the amount is a fixed parameter for a given product, the only variable in the product are the melt indices in the first and second zone.

The MFI per zone mainly depends on the hydrogen concentration and temperature in that zone. The MFI in the final zone will be directly correlated to the hydrogen concentration measured in the reactor off-gas, as is the case in normal operation. The MFI in the first zone will mainly be correlated with the hydrogen to polyolefin ratio in the first zone.

What is claimed is:

1. An olefin polymerization process comprising polymerization of at least one olefin monomer in more than one polymerization zone of one or more reactors wherein the polymerization process is carried out in an apparatus comprising:
   a) one or more reactor vessels to which olefin monomer and catalyst components can be added and which contain an agitated bed of forming polymer particles;
   b) one or more valve-controlled liquid feed ports in the reactor vessels through which catalyst components and quench liquid are added, wherein the catalyst components and quench liquid are added directly into and onto the bed of forming polymer particles;

c) a recycle gas feed system connected to one or more valve-controlled gas feed ports in the reactor vessels through which olefin monomer and hydrogen gas are provided to the reactor vessels, wherein the recycle gas feed system comprises:
   1) a means for removing reactor off-gases along the top of the reactor vessel;
   2) a first separator for separating the quench liquid, polymer fines and catalyst components from polymerization monomer and hydrogen; and
   3) a second separator for separating the polymerization monomer and hydrogen into separate recycle streams; and d) one to n valve-controlled ports located underneath the polymer bed through which the olefin monomer and hydrogen gas may be introduced to the reactor vessels, where n is three quarters of the total number of valve-controlled gas feed ports for the monomer and where n is three quarters of the total number of valve-controlled gas feed ports for the hydrogen gas;

e) a take-off barrier situated at the exit end of the reactor vessel through which solid polymer product is removed;

f) a device for removing solid polymer product from the take-off barrier;

g) a finishing apparatus for adding suitable additives to the solid polymer product; and h) an extruder for incorporating the additives into the polymer by heating and mechanical shear and extruding the heated polymer through a die to form discrete pellets;

wherein the process comprises the steps of
   1) introducing one or more streams of olefin monomer having hydrogen concentrations of 0 mole % to about 70 mole % into a first polymerization zone;
   2) introducing one or more streams of olefin monomer having hydrogen concentrations of 0 mole % to about 70 mole % into a subsequent polymerization zone; and
   3) removing a polymer product having a polydispersity of from about 5 to about 20 from the last polymerization zone, wherein the amount of hydrogen gas provided to the reactor vessels by the recycle gas feed system is adjusted to maintain a constant melt flow rate for the polymer product.

2. The process of claim 1, wherein the recycle gas feed system provides a hydrogen-lean stream to a first reaction zone and a substantially hydrogen-free stream of an olefin monomer to a subsequent reaction zone.

3. The process of claim 2, wherein the hydrogen-lean stream has from about 10 to about 300 parts per million by volume of hydrogen gas.

4. The process of claim 2, wherein the hydrogen-lean stream and substantially hydrogen-free stream are each monitored and adjusted by a controller which measures the compositions of first reaction zone and subsequent reaction zone gas samples.

5. The process of claim 4, wherein the controllers adjust the concentration of hydrogen gas in each reaction zone by varying the number of valve-controlled gas feed ports in service and the number of valve-controlled liquid feed ports in service based on calculated polymerization rates for each reaction zone.

6. The process of claim 1 in which propylene or a mixture of propylene and ethylene is polymerized in a first reaction zone at a first temperature and in a subsequent polymerization zone at a different temperature.

7. The process of claim 1 in which propylene or a mixture of propylene and ethylene is polymerized in a first reaction zone with a first silane and propylene or mixtures of propylene and ethylene are polymerized in a subsequent polymerization zone in which a different (or combination of the first and a different) silane is introduced.

8. The process of claim 1 in which propylene or a mixture of propylene and ethylene is polymerized in a first reaction zone with a first co-catalyst and propylene or mixtures of propylene and ethylene are polymerized in a subsequent polymerization zone in which a different (or combination of the first and a different) co-catalyst is introduced.

9. The process of claim 1 wherein the reactors are compartmented, wherein each compartment of the reactor is physically separated by a dividing structure that controls vapor intermixing between compartments while allowing free polymer particle movement from one compartment to the other in the direction of the take-off barrier.

* * * * *